INVENTOR.
MALCOLM W. MILES
BY
Richard K. MacNeill

June 20, 1967 M. W. MILES 3,327,307
MOVEMENT AND POSITION DETECTOR
Filed April 14, 1965 2 Sheets-Sheet 2

INVENTOR.
MALCOLM W. MILES
BY
Richard K. MacNeill

United States Patent Office 3,327,307
Patented June 20, 1967

3,327,307
MOVEMENT AND POSITION DETECTOR
Malcolm W. Miles, 340 Rutherford,
Goleta, Calif. 93017
Filed Apr. 14, 1965, Ser. No. 448,050
5 Claims. (Cl. 343—9)

The present invention relates to a movement and position detector, and more particularly to a movement and position detector for detecting vertical position and rates of change thereof.

Prior art movement and position detectors, such as in the radio altimeter frequency band, are of two general types, i.e., the frequency modulated continuous wave altimer and the pulsed radar altimeter system. The former has the serious disadvantage of being degraded by a Doppler shift, and the latter has the disadvantage of having a requirement for high peak transmitter powers and associated high current and voltage circuitry, often a hazard in today's aircraft. Both frequency modulated continuous wave and pulsed radars lack the ability to discriminate between the earth below, and engine pods, landing gear and aircraft's external stores, frequently resulting in the presentation of misleading altitude data to the pilot or autopilot, and making the task of installing the antennas or sound transducers extremely critical insofar as their location with respect to adjacent fixed structural components is concerned. Fathometer systems on board ship suffer, generally, from the same disadvantages mentioned above.

According to the invention, two sources of electrical energy are provided by two transmitters operating at close to the same frequency. Each of the transmitters is coupled to a transducer such as an antenna in the case of the altimeter, or an electrical acoustical transducer in the case of a Fathometer application. The frequencies of the two transmitters are always different and constant, their specific difference determining the maximum distance at which an unambiguous range to a reflecting object such as the ground or an ocean floor can be determined. Each transmitter is also coupled to a transformer, where a small amount of their output signals are coupled to a mixing circuit. In the case of sound frequencies, the transformer may be a conventional wire and core type and in the case of radio or radar frequencies, it may be a circulator or directional coupler, etc. Both of these signals retain their characteristic angular velocity, i.e., their frequency, as they travel over the electrically fixed-length paths from their respective transmitters to their respective mixing circuits.

Upon having launched into a free-space or a water transmission medium, the dual frequency transmitter signals will travel until striking a surface or object having suitable reflecting properties, such as the earth below an airplane or the ocean floor below a ship. Energy returned by said reflecting surfaces or objects will re-enter the antennas or sound transducers and be likewise coupled to the mixing circuits. When the distance between the antennas or transducers and the surface or object is fixed, i.e., no relative motion exists, the outputs of the two mixers will merely be the original difference frequency between the two transmitted signals because a certain amount of cross-coupling or leakage will always be present. However, when a relative motion exists between the wave launching components and the reflecting body the accompanying electrical path length change induces a slight change in the frequency of signals received after reflection, known familiarly as Doppler's effect. The outputs of the two mixers under this circumstance will be the difference frequencies between their original transmitter frequency component prior to launching, and the Doppler shifted transmitter frequency component received by reflection. Each mixer output signal will be its own characteristic detected Doppler-induced frequency due, of course, to the original fixed frequency separation between the two transmitting energy sources. Over the usual range of transmission path length change rates to be encountered, the Doppler outputs of the mixers will always be much less in frequency than the frequency difference between the transmitting energy sources. Rather than treating the two mixer outputs as two slightly different frequencies, they are treated as though they had identical frequencies and differed only in their relative phase angles. This phase difference between the two mixer outputs, regardless of the absolute frequencies of their detected Doppler output, will be a direct measure of the distance to the reflecting surface or object. The frequency of either mixer output signal is directly proportional to the relative distance rate-of-change between the transmitting antenna or sound transducer and the reflecting surface or object. Phase angle difference information is then converted to analog form by a novel phase metering system. Frequency information is converted to analog form by employing conventional frequency metering circuitry.

An object of the present invention is the provision of a movement and position detector in which the output data is not degraded by Doppler's shift, but actually employs Doppler's effect in the determination of distance or position information.

Another object is to provide a movement and position detector in which minimum range accuracies are not obscured or altered by the presence of structural components at the transmitting station.

A further object of the invention is the provision of a movement and position detector having a novel phasemeter for detecting position.

A still further object of the invention is to provide a movement and position detector requiring absolutely no modulation upon the radiated output signal, e.g., pulses or FM (frequency modulation), thus hampering attempts of an enemy to deduce the purpose or end use of the system by examining its modulation characteristics, restricting his ability to employ suitable electronic countermeasures for the purposes of jamming, decoying, and the establishment of an erroneous data presentation to the pilot or autopilot.

Another object of the invention is to permit the use of an extremely low data frequency and narrow frequency range data band width, enabling extremely high signa to noise ratios to be obtained with only relatively low transmitter output power.

Yet another object of the invention is to provide a means for continually monitoring the position of an object or surface during the time said position changes are occurring, without having to resort to the smoothing or averaging of position data.

Still another object is to provide a movement and position detector which is inexpensive to construct and simple to install.

Yet another object of the present invention is the provision of a movement and position detector which is simple to operate and requires a minimum of maintenance and adjustment.

Other objects and many of the attendant advantages of this invention will be readily appreciated as the same becomes better understood by reference to the following detailed description when considered in connection with the accompanying drawings, in which like reference numerals designate like parts throughout the figures thereof, and wherein.

Figures 1, 2:
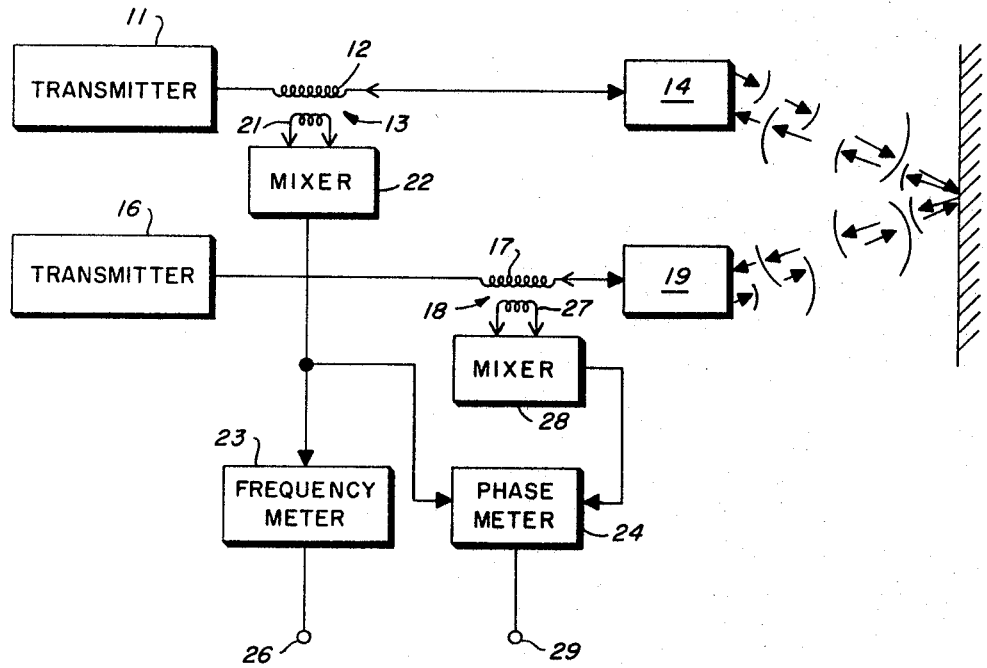
FIG. 1 is an illustration of the preferred embodiment of the present invention in block diagram and schematic form.
FIG. 2 is a block diagram of a simple frequency meter.

Referring to FIG. 1, transmitter 11 is coupled through winding 12 of transformer 13 to transducer 14. Transmitter 16 is coupled through primary winding 17 of transformer 18 to transducer 19. Secondary winding 21 of transformer 13 is coupled to an input of mixer 22, the output of which is connected to frequency meter 23 and one input of phasemeter 24. Frequency meter 23 has an output terminal 26.

Secondary winding 27 of transformer 18 is connected to the input of mixer 28, the output of which is connected to another input of phasemeter 24. Phasemeter 24 has output terminal 29.

Referring to FIG. 2, frequency meter 23 is indicated by the dotted lines. Having an input connected to monostable multivibrator 31, the output of which is passed through low pass filter 32 to output terminal 26.

Figure 3:
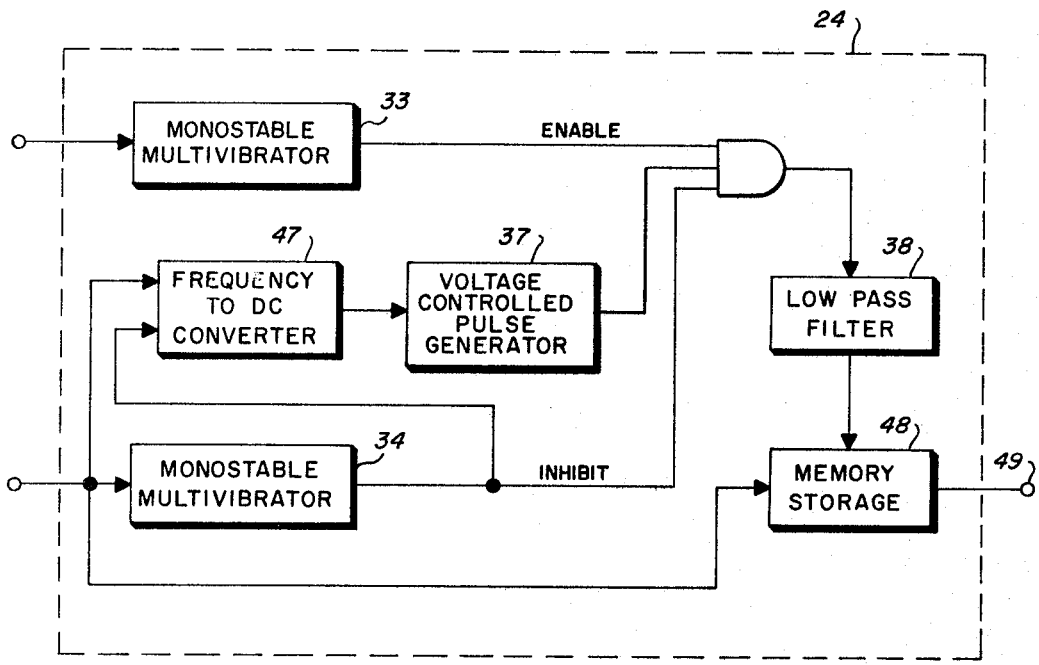
FIG. 3 is a block diagram of a novel phasemeter for utilization with the present invention.

Referring to FIG. 3, inputs from mixer 22 and mixer 28 are coupled to monostable multivibrators 33 and 34. An output of monostable multivibrator 33 is connected to an enable input of gate 36. An output of monostable multivibrator 34 is connected to an inhibit input of gate 36, and to an input of frequency to D.C. converter 47. Voltage controlled pulse generator 37 has an input coupled to an output of frequency to D.C. converter 47 and an output coupled to a signal input of gate 36. The output of gate 36 is coupled through low pass filter 38 to memory storage 48. A memory released reset is coupled from mixer 28. An output is taken at output terminal 49.

Figure 4:
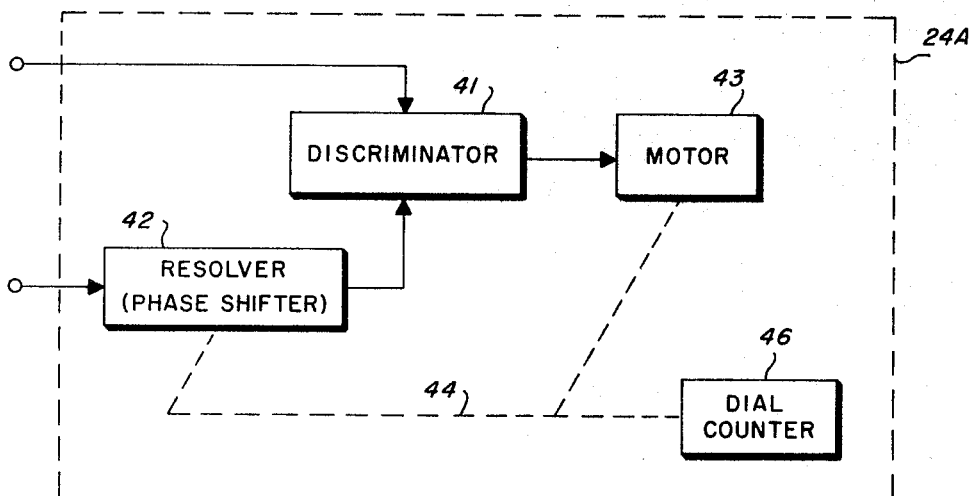
FIG. 4 is a block diagram of an electro-mechanical phasemeter.

Referring to FIG. 4, an input from either mixer 22 or 28 is coupled directly to one input of discriminator 41. The other input from either mixer 22 or 28 is coupled through resolver 42 to another input of discriminator 41. The output of discriminator 41 is coupled to D.C. motor 43. The shafts of D.C. motor 43 and resolver 42 are coupled together, as indicated by dotted lines 44, as is dial counter 46.

*Operation*

As previously mentioned, the entire system can operate either at sonar wavelengths for shipboard depth sounding applications or at radio and radar wavelengths for aircraft altimeter applications. (Nor is it meant to imply that the use of this system is in any way restricted to useage in the vertical plane, since it is equally feasible, for example, to employ such a system at radar wavelengths in a lateral plane for such a purpose as monitoring the presence and position of an enemy foot soldier attempting to overrun a friendly camp under cover of darkness or jungle foliage. Said system will not, of course, be responsive to static adjacent objects, but will respond only to moving targets.)

The various illustrations are shown in block diagram and schematic form, and it is deemed to be well within the purvue of the artisan to adapt the system to any of the potential applications mentioned above.

Two unmodulated carrier signals from transmitters 11 and 16 at frequencies $F_1$ and $F_2$, propagated at a velocity $c$, will have nearly identical angular velocities 2 $F_1$ and 2 $F_2$ radians per second (since the two frequencies are very close), and will have an increasing phase angle difference between them as a function of time, becoming 360° for each and every amount of elapsed time corresponding to the velocity of propagation, a known constant, divided by the exact frequency difference between the two carriers, a fixed and known constant. Thus, the directly coupled transmitter output components appearing at the inputs to the mixers at 23 and 28 constitute merely a sample of each transmitter's output. The remaining and major portions of the transmitter outputs will, likewise, have an increasing phase difference between them as they travel from transmitting antennas (or sound transducers) 14 and 19 to earth or ocean bottom and back to the antennas or transducers. This phase difference will, similarly, become 360° when the total number of wavelengths, at the unmodulated carrier frequency, to the reflecting surface and back is one greater for $F_1$, for example, than for $F_2$. This phase difference increases linearly with time, since both radiated transmitter signals travel at the same propagation velocity, $c$. Being a linear function of time this phase difference is then also a linear function of distance (altitude, depth, et al.) since $T=2H/C$, where T is the roundtrip travel time, C is the propagation velocity and H is the altitude, for example. Phase angle, being relative rather than absolute in nature, explicitly requires a fixed reference phase angle in order to discern any change or alteration in itself. The simplest means for affording such a reference, in the context of this invention, would be merely to utilize the phase angle of the resultant formed by vectorially combining the two direct coupled components of $F_1$ and $F_2$. Then the phase angle of the resultant formed by vectorially combining the two reflected signal components of $F_1$ and $F_2$ will contain the desired altitude or distance information when it compared phase-wise to the direct coupled signal phase angle resultant. This simple means is not necessarily the most practical since there will certainly be inherent problems of isolation between the direct coupled and the reflected signal components. Rather, it is the premise of the invention to utilize this natural coherence between the direct and reflected signal components in each of transmitter signal frequencies, $F_1$ and $F_2$. Consider initially the two direct coupled signal components having, respectively, angular velocities of $350 \times F_1$ degrees per second and $360 \times F_2$ degrees per second, thus experiencing periodically relative phase angle differences of from 0° to 360°, because of the fact that $F_1$ does not equal $F_2$. Consider next the angular velocities of the two reflected signal components, when the reflecting surface or object is fixed at a stationary distance away from the antennas or transducers. These angular velocities will also be, of course $360 \times F_1$ degrees per second and $360 \times F_2$ degrees per second, but note that they will be retarded in their individual phase angles with respect to their direct coupled components by amounts of $360 \times 2h/\lambda_1$ degree and $360 \times 2h/\lambda_2$ degrees. The choice of the transmitter frequency difference, $F_1-F_2$ or $F_2-F_1$, if you please, determines the maximum distance at which $$(360 \times 2h/\lambda_2) - (360 \times 2h/\lambda_1)$$

is equal to 360 degrees. Now consider that the distance to the reflecting surface or object is changing, and for simplicities sake, let the closing or opening rate be of a uniform velocity, i.e., zero acceleration. Then the reflected component retardation terms must be re-written as $\pm 360 \times 2\dot{h}/\lambda_1$ degrees per second and $\pm 360 \times 2\dot{h}/\lambda_2$ degrees per second, the dot over the $h$ signifying velocity, and the plus or minus notation being used to signify closing or opening distance changes. As a consequence of this dynamic situation the frequencies of the reflected signal components must likewise be rewritten to read $360 \times F_1 \pm 360 \times 2\dot{h}/\lambda_1$ degrees per second, and
$360 \times F_2 \pm 360 \times 2\dot{h}/\lambda_2$ degrees per second.

When these two reflected components are now combined with their respective direct coupled signal components in their mixers, then the mixer output frequencies are written:

$(360 \times F_1)°/\text{sec.} - (360 \times F_1 \pm 360\ 2\dot{h}/\lambda_1)°/\text{sec.}$
or $\pm 360 \times 2\dot{h}/\lambda_1$ degrees/second
and $(360 \times F_2)°/\text{sec.} - (360F_2 \pm 360 \times 2\dot{h}/\lambda_2)°/\text{sec.}$
or $\pm 360 \times 2\dot{h}/\lambda_2$ degrees/second From the above it is seen that the signals out of the mixers are merely the incremental increases or decreases in the original frequencies, $F_1$ and $F_2$, caused during distance changes to the reflecting object or surface. These incremental frequency shifts are, of course, familiarly known as Doppler's effect or as a Doppler shift. Note the fact that the phase angle between these two Doppler frequencies is wholly dependent upon the distance, H, and the difference between $\lambda_1$ and $\lambda_2$ which, of course, are the wavelengths of frequencies $F_1$ and $F_2$. To find the distance, H, at which this phase difference data becomes ambiguous, i.e., becomes 360°, simply use the equation derived below.

Let $R = 2h =$ roundtrip distance
Let $Q1 = 2\pi R/\lambda_1 = 4\pi H/\lambda_1 =$ Retardation of Transmitter $F_1$ reflected component with respect to its direct coupled component.
Let $Q2 = 2\pi R/\lambda_2 = 4\pi H/\lambda_2 =$ Retardation of transmitter $F_2$ reflected component with respect to its direct coupled component.
Then let $$Q = Q1 - Q2 = 4\pi H \left( \frac{1}{\lambda_1} - \frac{1}{\lambda_2} \right)$$

Since $\lambda = C/F$ where C is the velocity of propagation and F denotes the frequency of any electromagnetic or sound wave.
Then, $$Q = 4\pi H \left( \frac{F_1}{C} - \frac{F_2}{C} \right)$$

and $Q/H = 4\pi(F_1 - F_2)/C$
Inverting both sides, $$H/Q = C/4\pi(F_1 - F_2)$$

Then $$H = \frac{C}{4\pi(F_1 - F_2)} Q$$

Letting=360 degrees i.e., at which point H becomes ambiguous
Then $H_{max}$ (unambiguous) $= C/2(F_1 - F_2)$ Summarily, it may be said that since the angular velocities of the two transmitted carriers $2\pi F_1$ and $2\pi F_2$ differ by a small amount, their respective Doppler angular velocities, $4\pi li/\lambda_1$ and $4\pi li/\lambda_2$, will likewise differ slightly, leading to an instantaneous phase difference between them that is a linear function of time or distance, just as is the case for the original carriers from which they were composed as a result of relative motion between antennas or transducers and the reflecting surface or object. Hence, a measurement of this roundtrip travel time in terms of this instantaneous phase difference will yield the desired continuous data concerning the instantaneous positional relationship between any vehicle containing such a system and a suitable reflector. The phase difference data can be calibrated in feet or in any other desired measurement of distance.

A direct measurement of the difference in frequency between either transmitted signal, $F_1$ or $F_2$, and its associated reflected signal component, such as that seen at frequency meter 23 of FIG. 1 will yield a measure of position rate-of-change, e.g., rate of ascent or descent in the case of the altimeter, and closing or opening rate between the ocean floor and the hull of a ship in the case of the fathometer. A simple frequency meter is shown in FIG. 2 having a monostable multivibrator being triggered by the A.C. output of mixer 22. The output of the monostable multivibrator then passes through a low pass filter 32, yielding a D.C. analog signal at output terminal 26 which is linearly proportional to position rate-of-change. This is in effect a conventional frequency to D.C. voltage converter.

A novel electronic phasemeter for use in block 24, FIG. 1, is shown in FIG. 3. Here the outputs from mixers 22 and 28 are coupled to the inputs of monostable multivibrators 33 and 34, respectively. The output of multivibrator 33 is utilized to enable gate 36 and the output of multivibrator 34 is utilized to inhibit gate 36. Hence, the phase difference between the two outputs will determine the on-time of gate 36, allowing pulses from the voltage controlled pulse generator 37 to pass through gate 36 during this time interval. The output of gate 36 is then passed through low pass filter 38 which yields a D.C. voltage proportional to distance from the reflecting object or surface. Since the frequency of the input A.C. signals to multivibrators 33 and 34 may range over several octaves or more, it is necessary to use the outputs of one of the monostable multivibrators to drive the frequency to D.C. converter 37. The output D.C. voltage of this unit is used to drive the voltage controlled pulse generator at 37. The width, and/or the amplitude and/or the frequency of the output pulses of voltage controlled pulse generator 37 are controlled in a pre-determined manner by the input D.C. driving voltage from frequency to D.C. converter 47 to assure a constant D.C. output from low pass filter 38 for each particular increment of phase difference in a manner completely independent of the input A.C. signal frequencies to monostable multivibrators 33 and 34. Since the output from phasemeter 24 at terminal point 29 is dependent upon a changing positional relationship between the antennas or transducers at 14 and 19 and the reflecting surface, i.e., in the absence of such a changing positional relationship there will be no outputs from mixers 22 and 28, it is desirable to employ the memory at 48 for data storage during intervals when the changing positional relationship is zero. This memory may be a storage capacitor or it can be a meter relay actuated to hold the position of an inscribing pen on a recorder or a pointer on a dial-type indicator. Other suitable memory or storage devices certainly exist, and the selection depends largely upon the primary end-use of the over-all system.

An alternate phasemeter, of an electromechanical nature, is shown in FIG. 4. Here, the output from one mixer is coupled to one input of discriminator 41, and the output from the other mixer is coupled through a phase shifting resolver 42 to the other input of discriminator 41. When there is a phase difference between the inputs of discriminator 41, a proportional D.C. voltage will appear at its output, causing a rotation of D.C. motor 43. The shaft of motor 43 is mechanically linked to the shaft of phase shifting resolver 42, and will rotate the resolver 42 until the input phase angle disparity has been neutralized, thus reducing the D.C. output of discriminator 41 to zero, and re-establishing the motor to a quiescent state. A dial counter 46 is also coupled to the shaft of motor 43, indicating distance (depth, altitude, etc.) in a continuous manner. Notice that the data is continually stored (memorized) by the shaft position of the motor and resolver combination, removing the necessity for a separate and distinct data memory.

It should be understood, of course, that all of the aforementioned disclosures relate only to preferred embodiments of this invention, and that it is intended to cover all changes and modifications of the examples of this invention herein chosen for the purposes of disclosure which do not constitute departures from the spirit and scope of this invention.

What is claimed is:
1. A movement and position detector comprising:
first and second transmitters, said first and second transmitters having first and second unmodulated outputs at first and second frequencies, respectively;
first and second transducers connected to said first and second transmitter outputs, respectively, for energization and for receiving any reflected energy;
first and second mixing means each having an input and an output, said first and second mixing means inputs coupled to said first and second transmitter outputs, and said first and second transducers, respectively; and a phasemeter having first and second inputs connected to the outputs of said first and second mixing means, respectively.

2. A movement and position detector comprising:

first and second transmitters, said first and second transmitters having first and second unmodulated outputs at first and second frequencies, respectively;

first and second transducers connected to said first and second transmitter outputs, respectively for energization and for receiving any reflected energy; and first and second mixing means each having an input and an output, said first and second mixing means inputs coupled to said first and second transmitter outputs, respectively;

first and second monostable multivibrators having first and second inputs, respectively, said first and second multivibrator inputs connected to said first and second mixing means outputs, respectively;

gating means having a signal input, an enable input, an inhibit input, and an output;

said first and second monostable multivibrator outputs coupled to said enable input and said inhibit input, respectively; and a voltage controlled pulse generator having an input coupled to said second multivibrator output and an output connected to said signal input; and readout means coupled to said gating means output.

3. A movement and position detector comprising:

first and second transmitters, said first and second transmitters having first and second unmodulated outputs at first and second frequencies, respectively;

first and second transducers connected to said first and second transmitter outputs, respectively, for energization and for receiving any reflected energy;

first and second mixing means each having an input and an output, said first and second mixing means inputs coupled to said first and second transmitter outputs, respectively;

a phasemeter having first and second inputs connected to the outputs of said first and second mixing means, respectively, and a frequency meter connected to the output of one of said first and second mixing means.

4. A phasemeter for developing a DC voltage proportional to a difference in phase between first and second signals comprising:

first and second monostable multivibrators having first and second inputs and first and second outputs, respectively, said first and second multivibrator inputs adapted for connection to first and second signals respectively;

gating means having a signal input, an enable input, an inhibit input, and an output;

said first and second monostable multivibrator outputs connected to said enable input and said inhibit input, respectively;

a voltage controlled pulse generator having an input coupled to said second monostable multivibrator output and an output connected to said signal input; and storage means coupled to said gating means output for indicating the average DC voltage present at said gating means output.

5. A movement and position detector comprising:

first and second transmitters, said first and second transmitters having first and second unmodulated outputs at first and second frequencies, respectively;

first and second transducers connected to said first and second transmitter outputs, respectively, for energization and for receiving any reflected energy;

first and second mixing means each having an input and an output, said first and second mixing means inputs coupled to said first and second transmitter outputs, respectively.

a phasemeter having first and second inputs connected to the outputs of said first and second mixing means, respectively;

a resolver having an input and an output and a rotatable shaft, said resolver input connected to one of said first and second mixer outputs;

a discriminator having first and second inputs and an output, said first input connected to another of said first and second mixer outputs and said second input connected to said resolver output; and a DC motor connected for energization to said discriminator output, said DC motor having a rotatable shaft mechanically coupled to said resolver shaft; and indicating means coupled to said DC motor shaft for indicating the position thereof.

References Cited
UNITED STATES PATENTS
3,018,477  1/1962  Brault _____ 343—7.7

RODNEY D. BENNETT, *Primary Examiner.*

CHESTER L. JUSTUS, *Examiner.*

R. A. FARLEY, *Assistant Examiner.*